United States Patent Office 3,817,945
Patented June 18, 1974

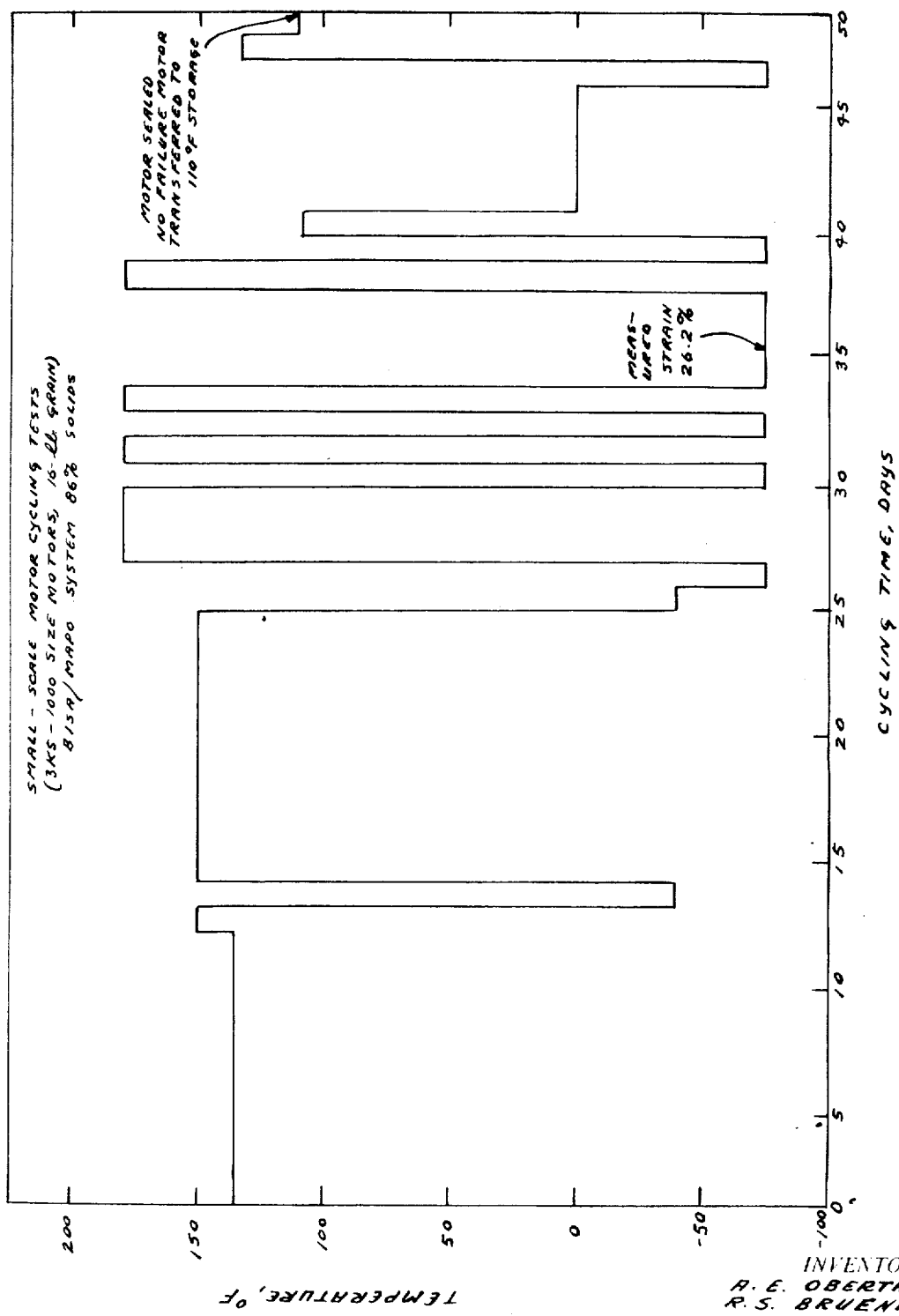

3,817,945
CURING SYSTEM FOR CARBOXY TERMINATED POLYBUTADIENE PROPELLANTS
Adolf E. Oberth, Fair Oaks, and Rolf S. Bruenner, Orangevale, Calif., assignors to the United States of America as represented by the Secretary of the Air Force
Filed Mar. 4, 1970, Ser. No. 19,148
Int. Cl. C08f 27/00, 3/42
U.S. Cl. 260—78.4 D                    4 Claims

ABSTRACT OF THE DISCLOSURE

A curing system for carboxy terminated polybutadiene (PBD) propellant binders consisting of a combination of the ethylaziridine adduct of sebacic acid (BISA) and trimethylaziridinylphosphine oxide (MAPO). The combination of BISA and MAPO is useful in that it forms a curative which results in improved temperature cycling capability and improved aging stability for PBD bound solid propellant grains.

BACKGROUND OF THE INVENTION

(1) Field of the Invention

This invention is in the field of curing agents for carboxy terminated polybutadiene.

(2) Description of the Prior Art

The difficulties involved in achieving solid rocket propellant grains which have good mechanical properties and which deliver high specific impulses are well recognizde. Polybutadiene (PBD) bound grains, in spite of certain physical problems, have come to be almost exclusively used as solid rocket propellants because they deliver a higher specific impulse than any other known propellant of a similar type.

The first solid propellant scaled up for use in the second stage of Minuteman Wing VI contained a binder based on PBD with trimethylaziridinyl phosphine oxide (MAPO) as the curing agent. To obtain the low modulus necessary for adequate elongation, only 75 equivalent percent of MAPO was used. This resulted in softening of the propellant during accelerated aging (180° F.). Investigations showed that the softening was caused by an internal rearrangement of the reaction product of MAPO with carboxylic acid radicals which caused breakage of P–N bonds and resulted in reduced crosslink density. Increasing the quantity of MAPO from 75 to 100 equivalent percent overcame the softening. However, the resulting propellants were very brittle.

Later, the butyleneimine adduct of trimesic acid (BITA) was substituted for MAPO. This also eliminated the softening problem because, once BITA reacted with the carboxylic acid groups, no bond breakage occurred at elevated temperatures. However, it was found that BITA itself is quite unstable and rearranges to form oxazolines and is thus hard to handle.

Since it had been observed that MAPO slowed down the after-cure hardening of propellants, a more advanced binder was formulated based on PBD and a mixture of MAPO with BITA. Propellants utilizing these binders showed practically no softening on aging at 180° F. and exhibited reduced after-cure hardening. However, MAPO/BITA cured PBD bound propellants had the disadvantage that both curatives were trifunctional. Thus, the only means by which mechanical properties (crosslink density) could be adjusted was by using more or less curative; i.e., by obtaining a more or less complete reaction of the aziridinyl groups with the carboxylic acid groups of the carboxy terminated polybutadiene. The use of too little curing agent resulted in an excess of free carboxylic acid groups which caused after-cure hardening of the propellant. The use of too much curing agent resulted in extremely hard propellants with high moduli and, consequently, low elongation. Thus, considerable time and effort has continued to be spent on the development of new and better curing agents for carboxy terminated polybutadiene.

SUMMARY OF THE INVENTION

It has now been found that the problems described above can be overcome by using a combination of the ethylaziridine adduct of sebacic acid (BISA) with MAPO as a curing agent for carboxy terminated polybutadiene. Therefore, this invention comprises an improved curing system for carboxy terminated polybutadiene which consists of the mixture of BISA with MAPO.

BRIEF DESCRIPTION OF THE DRAWING

The single Figure of the drawing is a plot of temperature against time for a thermal cycling test of BISA/MAPO cured polybutadiene solid rocket propellant grain.

DESCRIPTION OF THE PREFERRED EMBODIMENTS

The unexpected improvements in various physical properties of carboxy terminated polybutadiene solid rocket propellant binders may be best illustrated in tabular form. Table 1 is a comparison of some physical properties of several carboxy terminated polybutadiene binder systems cured with various curatives. The curing system of this invention comprises from 60 to 80 equivalent percent of the ethylaziridine adduct of sebacic acid and 100 equivalent percent of trimethylaziridinylphosphine oxide per 100 equivalent percent of carboxy terminated polybutadiene. $S_{nm}$ is nominal maximum tensile strength, $\epsilon_m$ is elongation at nominal maximum stress. E is Young's modulus. The binder systems were prepared using standard propellant mixing techniques. The systems were cured for approximately 10 days at 135° F.

TABLE 1

PBD propellants containing 88 weight percent solids, binders contain 25 weight percent isodecyl pelargonate plasticizer

| Curatives (eq. percent of PBD) | $S_{nm}$ (p.s.i.) | $\epsilon_m$ (percent) | E (p.s.i.) |
|---|---|---|---|
| MAPO (75 eq. percent) | 111 | 27 | 530 |
| MAPO (100 eq. percent) | 175 | 12 | 1,700 |
| BITA (130 eq. percent) | 100 | 32 | 440 |
| BITA/MAPO (55 eq. percent/55 eq. percent) | 140 | 26 | 320 |
| BISA/MAPO (75 eq. percent/100 eq. percent) | 146 | 36 | 530 |

From Table 1 it can be seen that the BISA/MAPO cured system exhibits greater elongation ($\epsilon_m$) than any of the other systems that it is compared with. This results from the relatively low Young's modulus. It can also be seen, from the above Table, that BISA/MAPO cured PBD retains excellent tensile strength in spite of its improved elongation properties.

Table 2 is a comparison of a BISA/MAPO cured PBD system with a BITA/MAPO cured PBD system both immediately after cure (10 days at 135° F.) and after two weeks of aging at 180° F. The Table also shows the effects of adding various additives to the system. The percentages given with the additives are weight percentages. All systems in the following Table contain 86 weight percent solids and, as in Table 1, the binder contains 25 weight percent isodecyl pelargonate. The BITA/MAPO system has a ratio of equivalent percents of PBD/BITA/MAPO of 100/55/55 while that of the BISA/MAPO system is 100/70/100. DFE is an abbreviation for diferrocenylethane.

and process. All formulation and casting was done utilizing standard techniques well known in the art.

TABLE 2

| Propellant | Additive | After cure | | | 2 wks aging at 180° F. | | |
|---|---|---|---|---|---|---|---|
| | | $S_{nm}$ | $\epsilon_m$ | E | $S_{nm}$ | $\epsilon_m$ | E |
| BISA/MAPO | | 149 | 41 | 550 | 137 | 44 | 550 |
| BITA/MAPO | | 132 | 35 | 650 | 190 | 29 | 1,075 |
| BISA/MAPO | 1% DFE | 130 | 44 | 440 | 124 | 41 | 520 |
| BITA/MAPO | 1% DFE | 106 | 41 | 475 | 185 | 29 | 1,085 |
| BISA/MAPO | 1% Fe$_2$O$_3$ | 140 | 44 | 470 | 159 | 41 | 640 |
| BITA/MAPO | 1% Fe$_2$O$_3$ | 140 | 36 | 580 | 185 | 28 | 900 |
| BISA/MAPO | 1% Cu | 120 | 46 | 400 | 133 | 26 | 660 |
| BITA/MAPO | 1% Cu | 133 | 30 | 730 | 220 | 18 | 1,450 |

The excellent aging stability of BISA/MAPO cured PBD systems is clearly evident in Table 2 from the fact that $S_{nm}$, $\epsilon_m$, and E of BISA/MAPO cured systems change relatively little upon aging compared to those of the BITA/MAPO cured PBD systems.

Table 3 shows how the crosslink density of BISA/MAPO cured systems may be varied by varying the equivalent percents of the two curing agents.

TABLE 3.—ADJUSTMENT OF CROSSLINK DENSITY IN BISA/MAPO SYSTEMS CONTAINING 86 WEIGHT SOLIDS

| Equivalents | | | | | |
|---|---|---|---|---|---|
| PBD | MAPO | BISA | $S_{nm}$ | $\epsilon_m$ | E |
| 100 | 100 | 80 | 132 | 52 | 370 |
| 100 | 100 | 70 | 150 | 45 | 500 |
| 100 | 100 | 60 | 175 | 35 | 600 |

In order to test the capability of BISA/MAPO cured PBD propellant binder systems and other systems, 16 pound-propellant grains were cast into rocket motors by standard techniques and subjected to temperatures ranging from 175° F. to —75° F. for 50 days. At the end of the 50-day period, the BISA/MAPO cured grains showed no failures. A plot of temperature against cycling time in days for a BISA/MAPO cured system appears in the single Figure of the drawing. The temperature was brought from its extreme high (175° F.) to its extreme low (—75° F.) four times during the 50-day period. When other propellant grains described in Tables 1 and 2 were exposed to similar conditions, they all failed in three or less extreme cycles.

During the course of experimentation involving the BISA/MAPO curative of this invention and the other curatives with which it was compared, it was found that BISA/MAPO systems were, in general, easier to handle

We claim:

1. A method for curing a carboxy-terminated polybutadiene which comprises mixing 100 equivalent percent of a carboxy-terminated polybutadiene with from 60 to 80 equivalent percent of the ethylaziridine adduct of sebacic acid and 100 equivalent percent of trimethylaziridinylphosphine oxide, and heating the resulting mixture at a temperature of about 135° F. for a period of about 10 days.

2. A curing method according to claim 1 wherein the equivalent percent of the ethylaziridine adduct of sebacic acid is 60.

3. A curing method according to claim 1 wherein the equivalent percent of the ethylaziridine adduct of sebacic acid is 70.

4. A curing method according to claim 1 wherein the equivalent percent of the ethylaziridine adduct of sebacic acid is 80.

References Cited

UNITED STATES PATENTS

| 3,507,837 | 4/1970 | Hidinger | 149—19 X |
| 3,476,622 | 11/1969 | Harada et al. | 149—19 |
| 3,305,523 | 2/1967 | Burnside | 149—19 X |
| 3,257,248 | 6/1966 | Short et al. | 149—19 |
| 3,182,040 | 5/1965 | Watkins et al. | 149—19 X |
| 3,147,161 | 9/1964 | Abere | 149—19 |
| 3,177,101 | 4/1965 | Vriesen | 149—19 |
| 3,087,844 | 4/1963 | Hudson et al. | 149—19 |

BENJAMIN R. PADGETT, Primary Examiner

U.S. Cl. X.R.

149—19.9, 19.91; 260— 24.7 N, 94.7 A, 96 R